W. S. SMITH.
CUSHION LOCK.
APPLICATION FILED JULY 12, 1921.
1,411,942.
Patented Apr. 4, 1922.
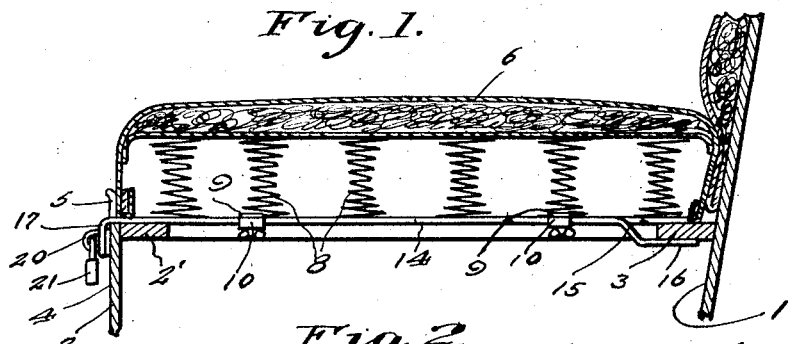
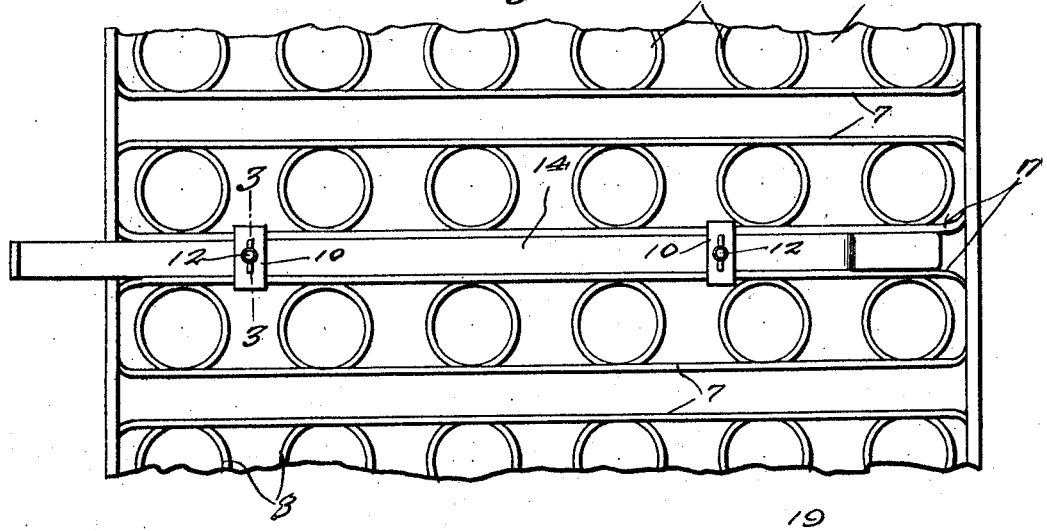
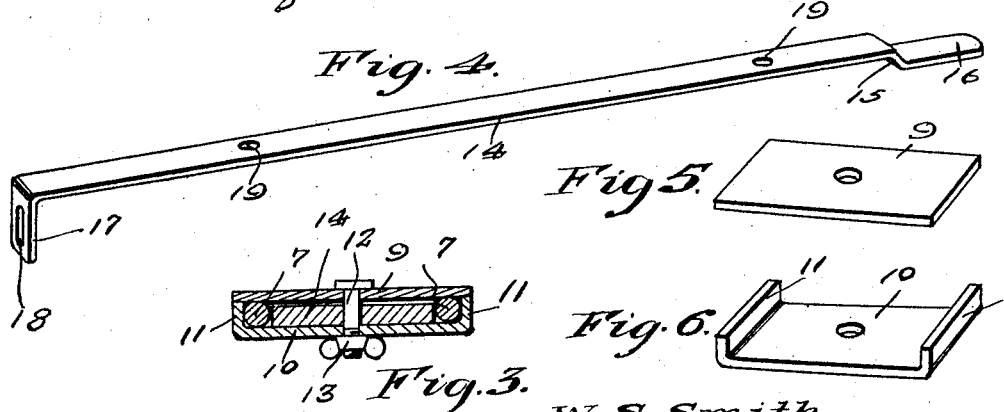
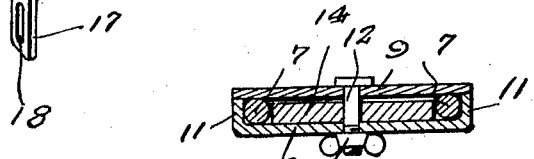
W. S. Smith. INVENTOR
BY *Victor J. Evans*
ATTORNEY
WITNESSES

UNITED STATES PATENT OFFICE.

WILLIAM SYLVESTER SMITH, OF NEWPORT NEWS, VIRGINIA.

CUSHION LOCK.

1,411,942.   Specification of Letters Patent.   Patented Apr. 4, 1922.

Application filed July 12, 1921. Serial No. 484,129.

*To all whom it may concern:*

Be it known that I, WILLIAM SYLVESTER SMITH, a citizen of the United States, residing at Newport News, in the county of Warwick and State of Virginia, have invented new and useful Improvements in Cushion Locks, of which the following is a specification.

In automobiles, it is a frequent custom to keep tools, accessories and other valuable articles in the box on which the seat cushion is supported. It is therefore a simple matter for a dishonest person to simply lift the cushion and remove the tools, etc. To prevent this, some automobile owners have had arranged upon the box support a metallic plate which is locked thereto. This has been found inconvenient, for the reason that the cushion must be first raised and removed and thereafter the plate unlocked and swung upwardly before access can be obtained to the tools in the box. It may therefore be considered the primary object of the present invention to provide a cushion seat for automobiles with means whereby the same can be effectively locked upon the support therefor and unlocked, to permit access to the box support, in an easy and expeditious manner.

It is a further object to produce a locking means for the seat cushion of automobiles which may be applied to the seat without altering the construction thereof.

The foregoing, and other objects which will appear as the nature of the invention is better understood, may be accomplished by a construction, combination and operative arrangement of parts, such as is disclosed by the drawings which accompany and form part of this specification.

In the drawings:—

Figure 1 is a fragmentary transverse sectional view through an automobile seat cushion and the box seat on which the same is supported.

Figure 2 is a bottom plan view of the cushion with the lock applied.

Figure 3 is a sectional view on the line 3—3 of Figure 2.

Figure 4 is a perspective view of the locking bar.

Figures 5 and 6 are similar views of the combined supporting and guide members for the locking bar.

In the drawings, the numeral 1 designates the back seat or box of an ordinary construction of automobiles, the front 2 whereof, being extended, in the usual manner, above the horizontally arranged bracing frame for the seat. For distinction, the inner longitudinal member of the frame is indicated by the numeral 2, and the outer member by the numeral 3. These members are, of course, connected by transverse members, and the front plate 4 of the seat is notched, as at 5 from its upper edge to the outer frame bar 2.

The cushion seat, indicated by the numeral 6, is of the ordinary construction, the same being provided with the usual springs that are connected in series by the usual bars 7. A pair of these bars is, of course, disposed between each of the series of springs 8, and in carrying out my invention, I arrange over two of the adjacent bars 7 flat plates 9. Beneath these plates I arrange clips 10. The clips comprise straight body portions having angle ends 11, and these angle ends may have their edges in contacting engagement with the plates 9, or if desired, the plates 9 may be received between the said angle ends. Each plate and each clip has a central opening therethrough, and through these aligning openings there is passed a bolt 12, and each bolt is preferably engaged by a winged nut 13. The pairs of plates and clips provide guides for the locking bar 14. The bar preferably comprises a flat strip of metal that has its inner end offset downwardly, as at 15 and continued to provide a finger 16. The opposite end of the bar 14 is flanged downwardly, as at 17 and provided with a slot 18. The bar 14 is provided with spaced elongated slots 19 respectively through which the bolts 12 pass. The bolts 12 thus serve as a means for limiting the sliding movement of the bar 14 through the guides provided by the plates and clips and the said bolts, contacting with the end walls provided by the slots limit the longitudinal movement of the locking bar through the guides. The finger 16, being offset from the bar 14 is arranged in a position to slide beneath the rear member 3 of the frame for the box seat. The outer end of the bar passes through the notch 5, and when the bar is in locking position the offset end 17 thereof will be in contacting engagement with the front 4 of the box seat. On the outer face of the front plate 4 there is secured a staple 20 that is designed to pass through the slot 18 in the angle end 17 of the locking bar and also to receive the hasp of a suitable lock 21.

In a manner as above described, it will be noted that a cushion may be effectively locked upon its seat, that the construction is simple and may be readily attached to any ordinary cushion and seat of an automobile. It will be further noted that the locking bar 14 remains a permanent part of the cushion and that the angle or offset end 17 of the locking bar 14 provides a means whereby the cushion may be readily lifted from the supporting seat when access is to be obtained to the interior of the said seat.

Having described the invention, I claim:—

In combination with the seat of an automobile having a cushion supporting frame at the top thereof and a cushion on said frame, and said cushion having series of springs connected by rods, of means for locking the cushion on the seat, comprising a bar slidable transversely on the outer face of the cushion and having its inner end offset to underlie the rear frame support when the bar is in locking position, said bar having its outer end downturned and slotted and having its straight portion provided with spaced elongated slots, the outer face of the cushion support having a staple to be received through the last mentioned slot when the bar is moved to locking position, plates arranged over two of the adjacent supporting bars for the springs, clips disposed below the plates having offset angle ends directed toward the plates, removable securing means passing through each clip and each plate and through the mentioned elongated openings in the straight portion of the locking bar, whereby the longitudinal movement of the locking bar is limited by engagement with said securing means.

In testimony whereof I affix my signature.

WILLIAM SYLVESTER SMITH.